United States Patent [19]

Iijima

[11] 4,293,739
[45] Oct. 6, 1981

[54] CIRCUIT WITH CROSSTALK ELIMINATION CAPABILITY

[75] Inventor: Yasuo Iijima, Tokyo, Japan

[73] Assignee: Nippon Electric Co., Ltd., Tokyo, Japan

[21] Appl. No.: 116,497

[22] Filed: Jan. 29, 1980

[30] Foreign Application Priority Data

Jan. 30, 1979 [JP] Japan ................................. 54-9456

[51] Int. Cl.³ .......................... H04Q 3/50; H04Q 1/36
[52] U.S. Cl. ................................................ 179/18 GF
[58] Field of Search .......... 370/6; 179/18 GF, 18 GE, 179/78 R, 80, 78 A, 79; 307/241, 254

[56] References Cited

U.S. PATENT DOCUMENTS

| 3,720,792 | 3/1973 | Resta | 179/18 GF |
| 4,053,716 | 10/1977 | Enomoto | 179/18 GF |
| 4,057,691 | 11/1977 | Goto et al. | 179/18 GF |

FOREIGN PATENT DOCUMENTS 1148289  5/1963  Fed. Rep. of Germany .......... 370/6

*Primary Examiner*—Thomas A. Robinson
*Attorney, Agent, or Firm*—Laff, Whitesel & Rockman

[57] ABSTRACT

A switching network has a group of incoming lines respectively connected to the terminal equipments of a plurality of subscriber stations. A group of outgoing lines are respectively connected to a plurality of trunk circuits. A plurality of crosspoints are formed between the incoming lines and the outgoing lines. Crosstalk is eliminated between mutually adjacent incoming lines or between mutually adjacent outgoing lines, by serially connecting a series circuit between the lines where crosstalk might otherwise occur. The serial circuit includes a phase inverter circuit and an impedance element having an impedance value which is sufficiently close to that of the impedance which is likely to cause crosstalk between these lines.

9 Claims, 5 Drawing Figures

CIRCUIT WITH CROSSTALK ELIMINATION CAPABILITY

BACKGROUND OF THE INVENTION

The present invention relates to circuits which are capable of eliminating crosstalk occurring between lines in a switching network for use in a telephone/data exchange system.

Heretofore, a switching network, used in a telephone/data exchange system, has eliminated crosstalk occurring between lines by either increasing the leakage resistance or reducing the stray capacitance, which are unavoidably present between the lines where crosstalk occurs. Alternatively, the prior networks have further reduced the imbalance of the ground impedance between two conductors constituting each line.

Meanwhile, along with the rapid progress attained in the application of semiconductor technology, crosspoint semiconductor switching elements have been developed, improved and applied to switching networks. However, limitations on manufacturing technology make it difficult to develop a semiconductor switching element having a sufficiently large leakage resistance or a sufficiently small stray capacitance. This resistance or capacitance is present between the terminals of semiconductor switching elements; therefore, it is often impossible to eliminate intelligible crosstalk which occurs between lines connected to the terminals of semiconductor switching elements. The crosstalk inevitably grows larger with increases in the size and scale of the switching network.

An unbalanced type of semiconductor switching network may have a greater variety than a balanced type network has, for economic reasons. Crosstalk between lines is particularly recognizable when a semiconductor switching elements are used in an unbalanced type of switching network. Accordingly, the more economically advantageous network is more detrimental to speech quality.

Efforts are often made to eliminate crosstalk by maximizing the leakage resistance and minimizing the stray capacitance between lines (i.e., between the terminals of semiconductor elements). However, in equipment depending upon such techniques, the maximization of the leakage resistance and the minimization of the stray capacitance seem to have reached their limits. For a disclosure of elimination of this kind of crosstalk, reference may be made to the switching network disclosed in U.S. Pat. No. 4,057,691, which eliminates crosstalk by grounding idle or unused lines, through impedance elements. However, such a system tends to have a smaller crosstalk elimination while the network is operating under heavy traffic loads, because the system design allows a very few lines to be left unused under such a grounded state, for economic reasons.

SUMMARY OF THE INVENTION

Therefore, an object of the present invention is to provide a circuit which is capable of eliminating crosstalk occurring between lines in switching networks of telephone/data exchange systems.

In accordance with an aspect of this invention, a circuit is serially connected between lines, in a switching network, where crosstalk is likely to occur. More particularly, a group of incoming lines are respectively connected between terminal equipment of plural subscriber stations and input terminals of the switching network. A group of outgoing lines respectively intersect these incoming lines. A plurality of crosspoint switching elements are arranged between these two groups of lines to selectively interconnect predetermined ones of the incoming and outgoing lines. A crosstalk elimination circuit may be serially connected between any two arbitrarily selected ones of the incoming or outgoing lines where crosstalk is likely. The serially connected circuit includes a phase inverter circuit and an impedance element having an impedance value which is sufficiently close to the leakage impedance between the two lines.

The term "impedance which is sufficiently close to" is used in this context to mean an impedance which is sufficiently high to eliminate crosstalk occuring between these two lines. For instance, in a switching network of a telephone exchange system involving a crosstalk of 70 dB attenuation, at 1 KHz, the impedance might be "sufficiently close" if the attenuation is substantially 90 dB, in order to adequately serve a practical purpose. Thus, it would be sufficient if the proportion or ratio of the impedance values of the impedance element, as compared to the value of the impedance causing the crosstalk between two lines is set somewhere between 0.9 and 1.1, provided that the phase angle difference between these two impedances is about 0.1 radian or less.

Thus, the present invention makes it possible to realize a practically useful and effective crosstalk eliminating circuit by serially connecting, between two lines, a circuit including a phase inverter circuit and an impedance element having an impedance value which is "sufficiently close" to the leakage impedance.

DESCRIPTION OF THE PREFERRED EMBODIMENT

Figure 1:
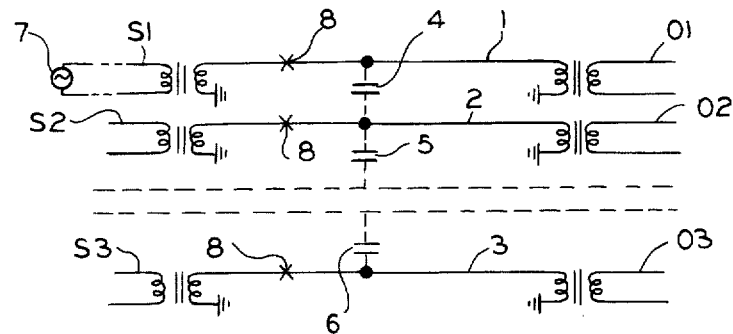
FIG. 1 is a schematic circuit diagram showing the principal parts of the groups of lines which develop crosstalk, in a conventional switching network.

FIG. 1 shows three exemplary subscriber lines S1, S2, S3 representing a group of lines which are connected to incoming terminals of a switching network formed by switching elements or crosspoints 8. Three exemplary lines 01, 02, 03 represent a group of outgoing lines which are connected to outgoing terminals of the network. The crosspoints 8 may be selectively operated in order to interconnect any incoming line with any outgoing line.

Along at least part of the path, the various line conductors are in such close proximity that there is a linking impedance such as stray capacitance between them, as represented by capacitors 4, 5, 6. This impedance linkage may cause crosstalk between the various lines.

The invention eliminates this crosstalk by providing a series circuit comprising phase inverter 10 and capacitor 14 which is serially connected between the lines and in parallel with the crosstalk impedance linkage 4. The serial circuit has an impedance which is approximately the same as the crosstalk causing impedance. Thus, the phases of signals passing through the serial circuit 10, 14 and the crosstalk causing impedance are substantially opposite and equal, in order to cancel each other.

In greater detail, a conventional switching network of a telephone exchange system (FIG. 1), has stray capacitances which are here represented by dotted line capacitors 4, 5 and 6 connected between mutually adjacent lines 1, 2 and 3. For instance, when a network crosspoint 8 is closed, the output of a speech signal generator 7 on subscriber line S1 is transmitted through a transformer to line 1 where it is transferred as crosstalk onto the adjacent line 2 via the stray capacitance 4. The magnitude of this crosstalk cannot be ignored. Obviously, the same crosstalk phenomena may also occur via the stray capacitances 5 and 6.

Figure 2:
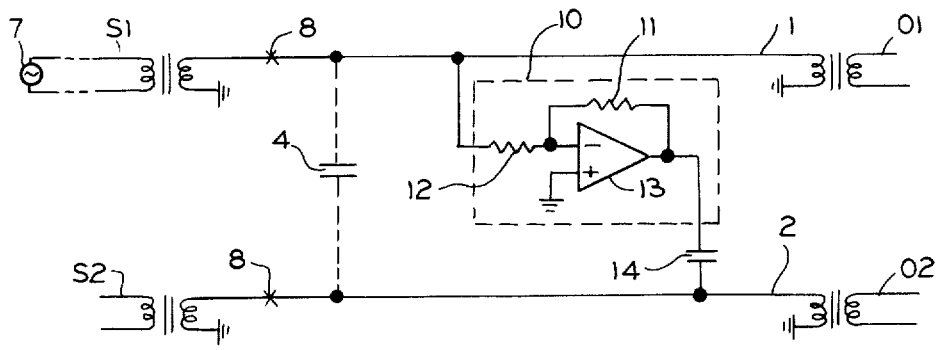
FIG. 2 is a schematic circuit diagram of a first embodiment of this invention including an impedance in series with a phase inverting operational amplifier.

FIG. 2 shows one specific embodiment of the present invention, wherein the numeral 10 refers to a phase inverter circuit, 4 to a stray capacitance causing crosstalk between lines 1 and 2, and 14 to a capacitive element having a static capacitance value which is close to that of the stray capacitance 4. The capacitor 14 also provides AC coupling and DC isolation between the output terminal of operational amplifier 13 and the line 2.

The phase inverter circuit 10 includes an operational amplifier 13, which provides phase inversion, and resistance elements 11 and 12. Resistance 11 provides a feedback control over the operational amplifier while resistance 12 provides an impedance coupling between line 1 and the operational amplifier 13. The resistances of these resistance elements are selected so that the voltage amplification factor can have an ideal value of $-1$ (i.e., $\exp(j\pi)$ in a complex algebraic expression). Thus, there may be compensation for or neutralization of any crosstalk occurring between the lines 1 and 2. In reality, it is almost impossible to set the voltage amplification factor exactly at $-1$ (i.e., $\exp(j\pi)$); therefore, this amplification may be set at a value which is sufficiently close to the ideal "$-1$," without causing any practical problem.

If crosstalk of the speech signal 7 is induced from the line 1 onto the line 2 via the stray capacitance 4, the impedance value $Z_{XT0}$ of the impedance causing crosstalk between the lines 1 and 2 is equal to $1/(\omega C_s)$, where: $C_s$ and $\omega$ represent the static capacitance value of the stray capacitance 4 and the angular frequency of the speech signal 7, respectively. On the other hand, the impedance value $Z_{XT1}$ of the impedance causing crosstalk from the line 1 via the phase inverter circuit 10, is attributable to the capacitive element 14. The static capacity value of element 14 is close to that of the stray capacitance 4, and is equal to $1/(\omega C_s')$, where $C_s'$ is the static capacitance value of the capacitive element 14. Hence, the impedance value $Z_{XT}$, causing the crosstalk between the lines 1 and 2, is the combined impedance value of an impedance $Z_{XT0}$ and an impedance $Z_{XT1}$ which are connected in parallel, (i.e., $Z_{XT}=(Z_{XT0}Z_{XT1})/(Z_{XT0}+Z_{XT1})=1/(C_s-C_s'))$.

The crosstalk eliminating circuit of this invention includes the phase inverter circuit 10 and the capacitive element 14. In this invention, the relationship between the static capacitance $C_s$ of the stray capacitance 4 and the static capacitance $C_s'$ of the capacitive element 14 is supposed to be $|C_s-C_s'|/|C_s+C_s'|>>1$. The impedance value of $Z_{XT}$ is almost infinitely great. Accordingly, the crosstalk induced from the line 1 onto the line 2 is neutralized and eliminated.

Figure 3:
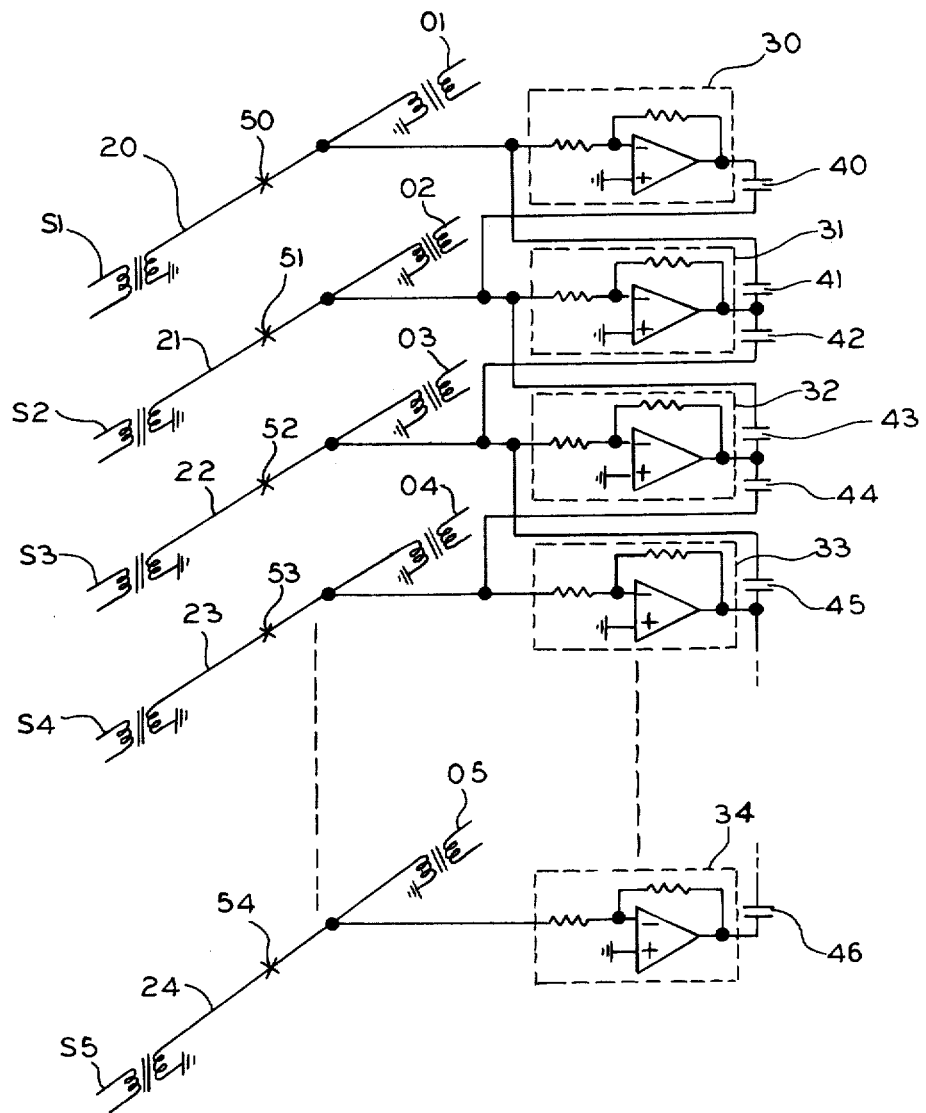
FIG. 3 is a schematic circuit diagram of the principal parts of a groups of lines in a switching network, to which the first embodiment of this invention is applied, by a number of serial circuits.

FIG. 3 shows a circuit arrangement as it may be used in the principal parts of groups of circuits in a switching network, wherein a plurality of the first embodiment crosstalk eliminating circuits are serially connected to one another. This switching network structure makes it possible to realize a switching network with little crosstalk between lines. In FIG. 3, the reference numerals 20 through 24 refer to communication paths; reference numerals 30 through 34 identify phase inverter circuits; reference numerals 40 through 46 refer to capacitive elements having static capacitance values which are close to those of the stray capacitances between mutually adjacent lines; and reference numerals 50 through 54 identify crosspoint switching elements.

As hitherto described, the present invention makes it possible to eliminate crosstalk occurring between lines in a switching network, using semiconductor switching elements, or the like. Since this invention may be readily implemented by a use of semiconductor switching elements, the circuit components may be made compact and light, and may be integrated with a semiconductor switching element. An inexpensive, compact and light switching network can be provided with a high speech quality.

Figure 4:
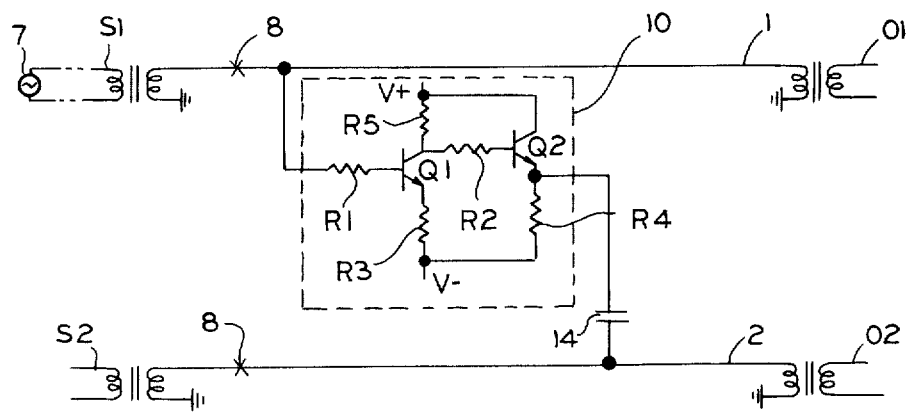
FIG. 4 is a schematic circuit diagram of a second embodiment of this invention including an impedance in series with a transistor used in a phase-inverting configuration.

FIG. 4 shows another embodiment of the present invention, wherein the phase inverter circuit 10 is composed of transistors, or the like, instead of an operational amplifier, as shown in FIGS. 2 and 3. Transistor $Q_1$ is a driving amplifier and transistor $Q_2$ is an emitter follower, which inverts the phase of its input signal.

In FIG. 4, resistors R1, R2 limit current and couple base electrodes. Resistors R3, R4 provide emitter bias, and resistor R5 is a collector load.

Figure 5:
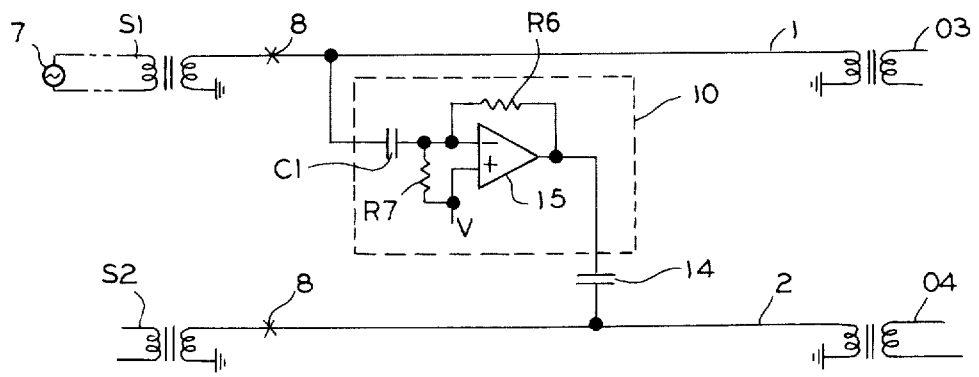
FIG. 5 shows the circuit arrangement of a third embodiment of this invention including an impedance in series with a phase-inverting operational amplifier.

FIG. 5 shows still another embodiment of this invention, in which phase inverter circuit 10 has a capacitive element $C_1$ connected to an input terminal of an operational amplifier 15 in order to isolate the input terminal from a DC potential on the line 1. Thus, capacitor $C_1$ couples the AC input of the operational amplifier to line 1 while protecting it from a direct application of the DC potential of the speech path. Resistor $R_6$ provides a feedback control for operational amplifier 15, while resistor $R_7$ provides input bias to the negative terminal thereof.

These embodiments are primarily intended for eliminating crosstalk which occurs between lines, owing to capacitive impedances. However, the invention can also eliminate crosstalk between lines which is caused by inductive impedances or resistive impedances or complexes thereof. Crosstalk can be neutralized and eliminated regardless of the causes.

Those who are skilled in the art will readily perceive how to modify the system. Therefore, the appended claims are to be construed to cover all equivalent structures which fall within the true scope and spirit of the invention.

What is claimed is:

1. A circuit for eliminating crosstalk between lines in a switching network, said network having a group of incoming lines respectively connected to input terminals thereof and a group of outgoing lines respectively intersecting these incoming lines, a plurality of switching crosspoint means arranged between the incoming and outgoing groups of lines for selectively interconnecting predetermined ones of the incoming and outgoing lines, crosstalk elimination means comprising a serial circuit having a phase inverter circuit means and an impedance circuit means which together has an impedance value sufficiently close to the impedance value of a leakage impedance between two of these incoming and outgoing lines, and means for connecting said serial circuit between said two lines.

2. The circuit claimed in claim 1, wherein said phase inverter circuit means comprises an operational amplifier means.

3. The circuit claimed in claim 1, wherein the impedance circuit means is a capacitive impedance element connected in series with said phase inverter circuit in said serial circuit.

4. The circuit claimed in claim 2, wherein said serial circuit comprises a resistance means connected between an input terminal of said phase inverter circuit means and a first terminal of said operational amplifier means, another resistance means connected between said first terminal of said operational amplifier and the output terminal of said operational amplifier, means for setting a second terminal of said operational amplifier at a predetermined bias potential, and means for connecting said output terminal of said phase inverter circuit means to the output terminal of said operational amplifier.

5. The circuit claimed in claim 2, wherein said phase inverter circuit means has a DC isolating and AC coupling means so that the DC potentials on said two lines may not be applied directly to said operational amplifier.

6. A crosstalk elimination circuit for conductors in such close proximity that they become electrically coupled to form crosstalk with each other, said circuit comprising phase inversion means having an impedance substantially equal to the impedance of the crosstalk causing electrical coupling, and means for coupling said phase inversion means between said coupled conductors and in parallel with said crosstalk causing electrical coupling, whereby two substantially equal and opposite signals pass between said electrically coupled conductors.

7. The circuit of claim 6 wherein said phase inversion means comprises an operational amplifier coupled in series with a capacitor and the series circuit is serially connected between said electrically coupled conductors.

8. The circuit of claim 6 wherein said phase inversion means comprises at least one transistor used in a phase-inverting configuration and coupled in series with a capacitor and between said electrically coupled conductors.

9. The circuit of any one of the claims 6, 7 or 8 and a network comprising a matrix of intersecting conductors which become electronically coupled to form crosstalk, there being one of said phase inversion means coupled to each of the conductors which may become coupled to form crosstalk, and means for serially interconnecting the phase inversion means coupled to said conductors.

* * * * *